United States Patent [19]
Kakizaki

[11] 3,802,328
[45] Apr. 9, 1974

[54] DEFLECTING NOZZLE FOR A MOTOR VEHICLE VENTILATING SYSTEM

[75] Inventor: Tadao Kakizaki, Yokohama City, Japan

[73] Assignee: Nissan Motor Company Limited, Yokohama, Japan

[22] Filed: Apr. 9, 1973

[21] Appl. No.: 349,037

[30] Foreign Application Priority Data
Apr. 12, 1972 Japan.............................. 47-43042

[52] U.S. Cl.................. 98/40 A, 137/601, 251/147
[51] Int. Cl............................................ F24f 13/08
[58] Field of Search ...... 98/40 A, 41 R, 2; 137/601; 251/147

[56] References Cited
UNITED STATES PATENTS
2,596,869  5/1952  Ross................................ 98/40 A X
2,837,991  6/1958  De Roo........................... 98/41 R X Primary Examiner—William E. Wayner

[57] ABSTRACT

A deflecting nozzle applicable to a fresh air ventilating system of a motor vehicle, which is provided with a flow regulating valve operable to assume open or closed positions by means of a control knob projecting from the nozzle.

6 Claims, 5 Drawing Figures

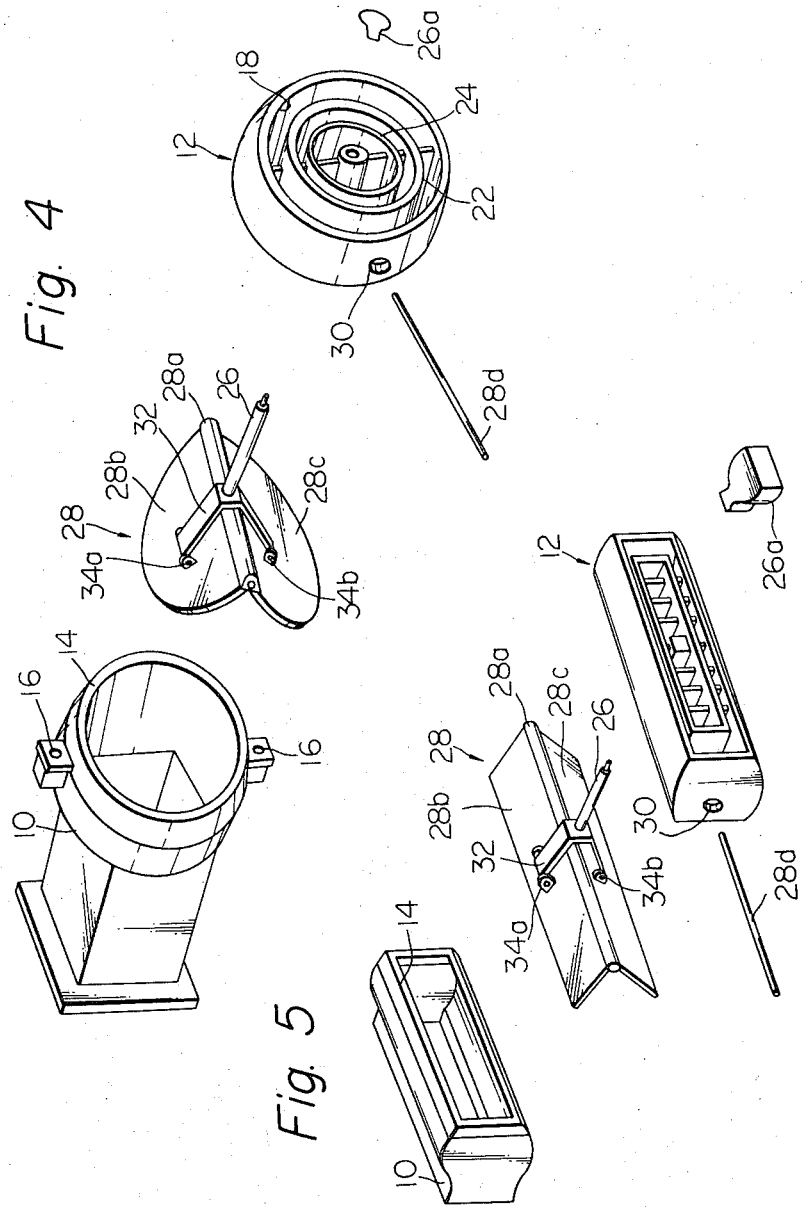

DEFLECTING NOZZLE FOR A MOTOR VEHICLE VENTILATING SYSTEM

The present invention generally relates to a ventilating system for a motor vehicle, and particularly to a deflecting nozzle of such a ventilating system.

Ventilating systems for motor vehicles known to date in the prior art comprise two ducts for conveying ventilating air. The two ducts extend from a heater or a fan unit to locations near the outermost extremities of the vehicle instrument panel, each of said ducts having a swivellable nozzle mounted at its far end by which the ventilating air can be directed either along the side windows of the car, or toward the front seat passenger's or driver's faces, and each of said ducts incorporating therein a butterfly valve by which the amount of ventilating air can be controlled. A control knob for opening and closing the butterfly valve is provided below the lower edge of the instrument panel below each swivellable nozzle (see FIG. 1).

Since, in prior art ventilating systems, the control knob is provided below the lower edge of the instrument panel below each swivellable nozzle, the driver experiences difficulty in locating and operating the control knob, and must in some cages direct his eyes from the road thus risking the possiblity of an accident.

The present invention intends to eliminate the abovementioned disadvantages of prior art ventilating systems.

The present invention essentially consists of a valve arrangement incorporated into a nozzle mounted in the outlet section of a duct of a ventilating system. A control rod is slidably mounted in the nozzle and has a control knob at one end and a clip at the other. The valve consists of two halves hingably connected together by means of a hinge pin fixably mounted to the nozzle. A valve seat for the valve is provided on the inlet end of the nozzle upon which the valve sections will seat. The clip secured to one end of the rod engages the two valve halves for springably pressing the two valve halves against the valve seat when the rod is pulled to a maximum extent from the nozzle, and for springably pushing the two valve halves away from the valve seat and pressing them against each other when the rod is pushed into the nozzle by a moderate force. One advantage achieved by present invention is that deflection of the nozzle and opening of the valve can be accomplished with the one control knob.

The springy clip will either press the two valve halves against the valve seat or against each other depending upon the position of the rod. There is a critical position of the rod: if the rod is pulled out of the nozzle beyond the critical position, the valve halves will be pressed by the clip against the valve seat, thus closing the valve. If, however, the rod is pushed into the nozzle beyond the critical position, the valves will be pressed by the clip against each other, thus opening the valve. Another advantage is achieved by the present invention in that opening and closing of the valve can be accomplished accurately and sensed by hand through the control knob.

Accordingly it is an object of the present invention to provide a nozzle of a ventilating system for a motor vehicle, by which the abovementioned disadvantages of prior art devices are eliminated.

Another object of the present invention is to provide a nozzle incorporating therein a valve.

A further object of the present invention is to provide a nozzle which assures accurate and noiseless operation of a valve.

Still another object of the present invention is to provide a nozzle which assures superior airtightness.

These and further objects, features and advantages of the present invention will become more obvious from the following description when taken in connection with the accompanying drawings which show, for purposes of illustration only, two embodiments in accordance with the present invention, and wherein:

FIG. 4 is an exploded view of the nozzle shown in FIGS. 2 and 3.

FIG. 5 is an exploded view of a nozzle according to another embodiment of the present invention.

Figure 1:
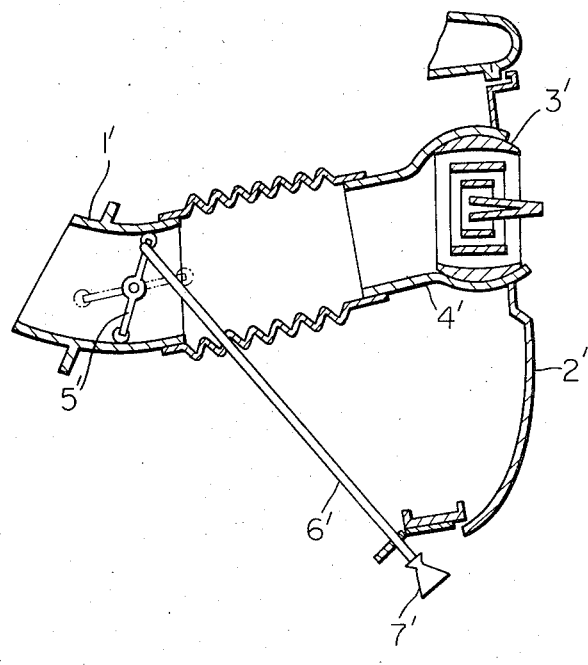
FIG. 1 is a partial sectional view of a prior art ventilating system for a motor vehicle, wherein a swivellable nozzle and a valve are installed.

In FIG. 1, a duct 1' extends to an instrument panel 2' of an automobile. The duct 1' has a swivellable nozzle 3' at its far end or outlet 4'. The swivellable nozzle 3' is swivellably mounted in the outlet 4'. A butterfly valve 5' is installed in the duct 1'. A control rod or linkage 6' is operatively connected to the valve 5' at one end, and has mounted at the other end a control knob 7'. The control knob 7' is provided below the lower edge of the instrument panel 2 below the swivellable nozzle 3' as illustrated.

Reference is made to FIGS. 2 through 5 of the drawings wherein like reference numerals are used throughout the various views to designate like parts.

Figure 2:
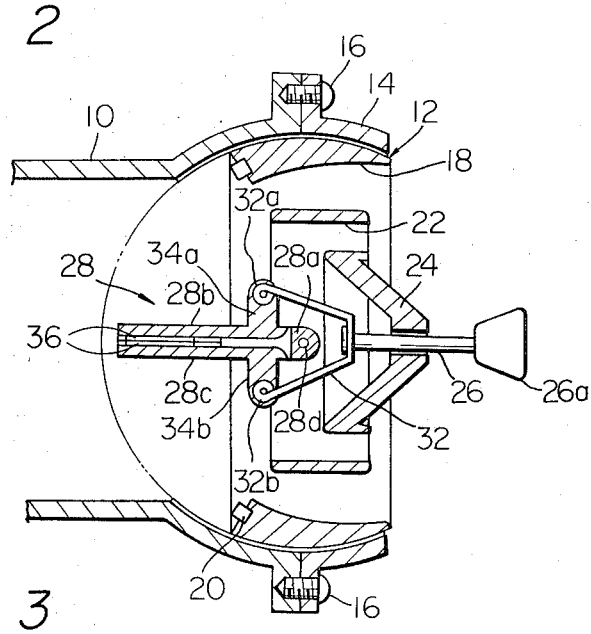
FIGS. 2 and 3 are sectional views showing one embodiment of the present invention, and illustrating conditions in which the valve is open and in which the valve is closed, respectively.
Figure 3:
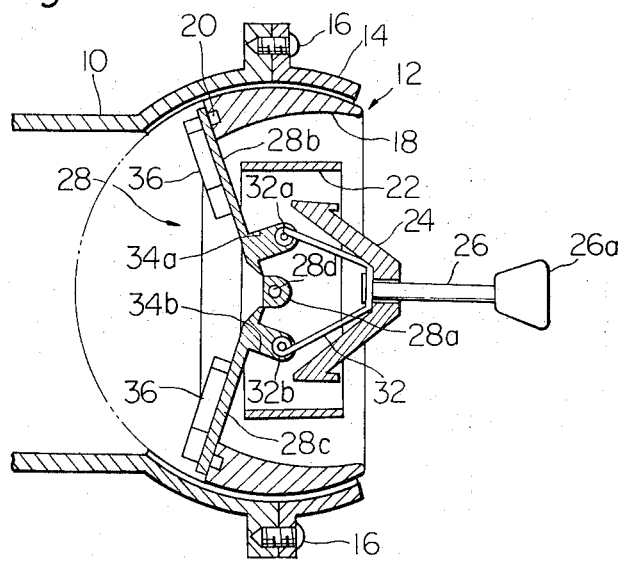

Referring first to FIGS. 2, 3 and 4, there is shown a preferred embodiment of the present invention comprising an outlet portion of a duct of a ventilating system for a motor vehicle. An outlet 10 formed at the far end of the duct has an inner wall defining a partial sphere.

A swivellable nozzle generally designated by a reference numeral 12 is mounted in the outlet 10 and is swivellably held in position therein by a cover 14 which is fastened to the outlet 10 by means of flanges integrally formed in the outlet 10 and the cover 14, and a plurality of bolts 16.

The swivellable nozzle 12 has a cylindrical housing 18, the outer wall of which defines a partial sphere. The cylindrical housing 18 has an inlet end and an outlet end (no numerals), and is provided at its inlet end with an annular valve seat 20. Fixedly disposed within the outer cylindrical housing 18 is a grille (no numeral) consisting of a cylindrical member 22 and a hollow cone-shaped member 24, through which a rod 26 extends slidably. The rod 26 has at its one end a control knob 26a.

A valve generally designated by a reference numeral 28 has two valve halves 28b and 28c of semicircular disk shape, which are hinged to each other by means of a hinge portion 28a. The hinge portion has a lengthwise cylindrical passage through which a hinge pin 28d extends. The hinge pin 28d at its both ends is fixed to the outer cylindrical housing 18 through radially opposed openings 30 on the outer cylindrical housing 18.

Lugs 34a and 34b as shown, are integrally formed with the respective valve halves 28b and 28c, and project from the sides of the valve halves facing the cooperating annular valve seat 20. The lugs 34a and 34b are disposed equally spaced from the hinge portion 28a, and more particularly from the hinge axis.

A clip 32 made of springy sheet metal is secured to the other end of the rod 26. The clip 32 has at its extremities eyelets 32a and 32b, for operative connection with the lugs 34a and 34b, respectively.

The eyelets 32a and 32b are connected with the lugs 34a and 34b in a conventional manner.

The valve halves 28b and 28c are provided with soft pads 36 on the sides opposite to those from which the lugs 34a and 34b respectively project.

The soft pads 36 are bonded to the valve halves by an adhesive.

The annular valve seat 20 is preferably made of an elastomeric foam such as a urethane foam in order to prevent noise when the valve 28 is seated thereon by the action of the clip 32.

The two valve halves 28b and 28c and hinge portion 28a of the valve 28 should be connected together in an airtight manner to assure airtightness when the valve 28 is closed. For the reasons mentioned hereinabove, the annular valve seat 20 is also made of urethane foam.

When the rod 26 is in the position shown in FIG. 2, the valve 28 is in the open position, and ventilating air is allowed to flow from the inlet end to the outlet end of the cylindrical housing 18 of the nozzle 12. In this position, the faces of the two halves 28b and 28c which are provided with the pads 36 are pressed together by the action of the clip 32. Deflector of the ventilating air can be accomplished by the noting valve halves 28b and 28c and the grille of the nozzel 12, if the knob 26a and the control rod 26 are oriented at an angle to the longitudinal axis of the duct 10.

When the control rod 26 is displaced manually from left to right as shown in FIGS. 2 and 3, the clip 32 will also move from left to right. Since the clip 32 at its extremities is operatively connected by the eyelets 32a and 32b to the projecting lugs 34a and 34b of the valve halves 28b and 28c, respectively, the valve halves 28b and 28c will rotate in such a way as to approach the annular valve seat 20 and thus provide closing of the valve 28. When the eyelets 32a and 32b are positioned to the left of the longitudinal axis of the hinge pin 28d, the valve will be returned to the open position shown in FIG. 2 by the springy clip 32. However when the knob 26a is moved to its most rightward position as shown in FIG. 3, since the eyelets 32a and 32b are positioned to the right of the axis, axis of the hinge pin 28d the valve halves will be pressed onto the annular valve seat 20 by the clip 32. The valve 28 is thus closed preventing ventilating air from passing through the nozzle 12.

It will be appreciated that the operator of the knob 26a can feel by hand whether the valve is closed or open. Thus, it is now understood that accurate and noiseless operation can be achieved by the present invention.

Referring to FIG. 5, there is shown another preferred embodiment of the present invention. A nozzle 12 herein illustrated is not swivellable in an outlet 10 but is mounted therein so that the nozzle can tilt upwards or downwards relative to the flow axis of the ventilating air. A valve 28 in this embodiment has two halves 28a and 28b of rectangular shape, connected to each other by a hinge portion 28a. The hinge portion 28a is mounted in the nozzle by a hinge pin 28d in the same manner as that described in the first embodiment. A rod 26 extends slidably through the outlet of the nozzle 12 and has at one end a control knob 26a, and at the other end a clip 32. The clip 32 is operatively connected with the valve halves 28b and 28c in the same manner as in the first embodiment.

The operation of this embodiment is essentially the same as that described with reference to the first embodiment illustrated in FIGS. 2, 3 and 4.

What is claimed is:

1. In a ventilating system for a motor vehicle having at least one outlet from which ventilating air flows out, a deflecting nozzle mounted in the outlet, said deflecting nozzle having formed at its inlet end a valve seat;

a valve cooperating with said valve seat, said valve having two valve halves hinged to each other by a hinge mounted to said deflecting nozzle;

a rod slidably mounted on said nozzle extending outward from said nozzle through the outlet end thereof;

a clip secured to said rod, said clip being connected with said two valve halves for pressing said two valve halves against said valve seat when said rod is in a predetermined position and for pressing said two valve halves away from said valve seat against each other when said rod is in a position other than said predetermined position.

2. A ventilating system as claimed in claim 1, in which said clip is connected to said two valve halves at two positions equidistantly spaced from the axis of said hinge.

3. A ventilating system as claimed in claim 2, in which each of said two valve halves is provided with a lug to which said clip is connected.

4. A ventilating system as claimed in claim 3, in which said hinge and said two valve halves are connected with each other airtightly.

5. A ventilating system as claimed in claim 4, in which each of said valve halves on a side opposite to the side from which said lug is projected is provided with a soft pad.

6. A ventilating system as claimed in claim 5, in which said valve seat is made of an elastomeric foam.

* * * * *